Feb. 26, 1946. R. H. GALBREATH 2,395,622
LOADING ATTACHMENT FOR TRACTORS
Filed Feb. 8, 1944
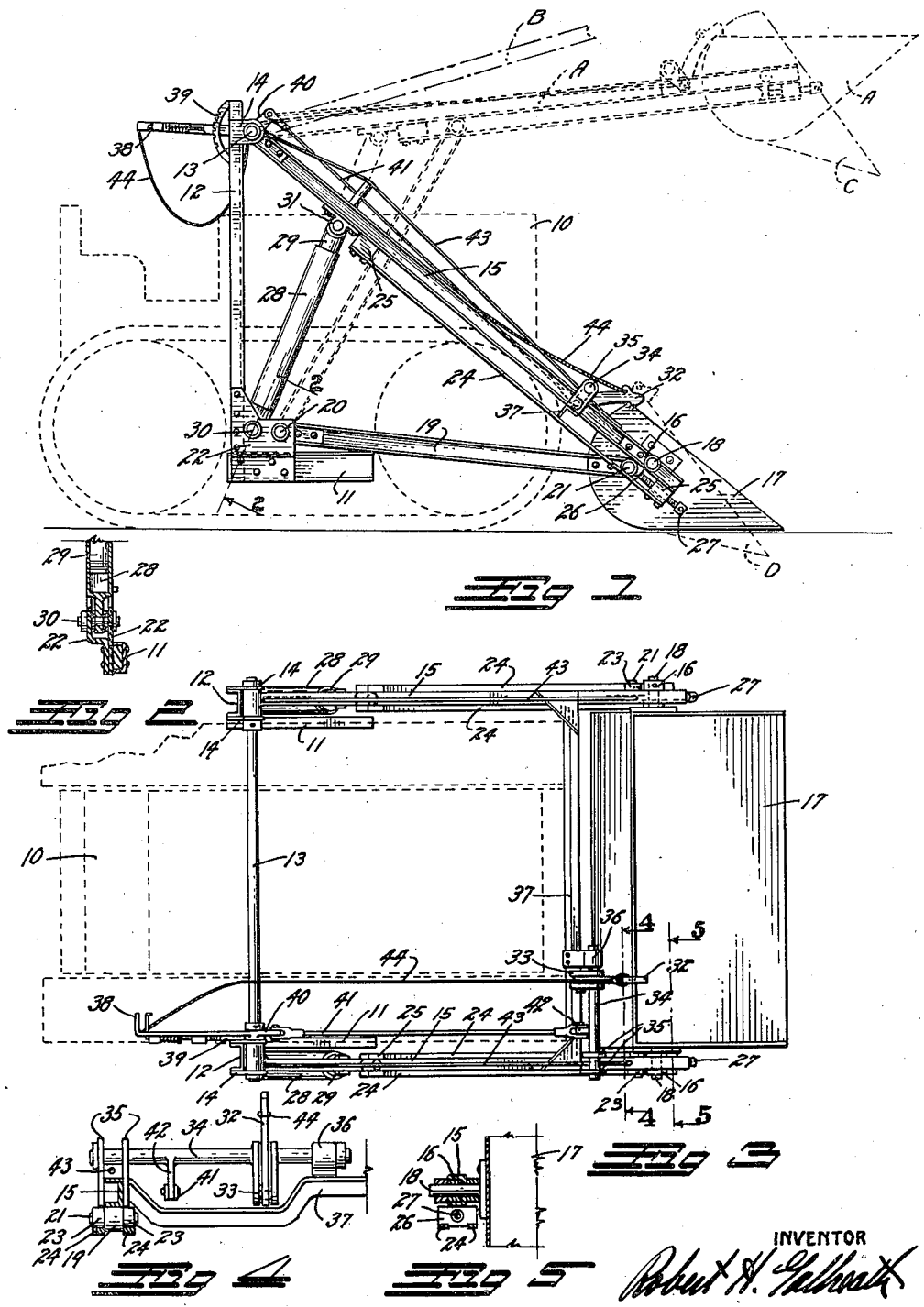
INVENTOR
Robert H. Galbreath Patented Feb. 26, 1946

2,395,622

UNITED STATES PATENT OFFICE 2,395,622

LOADING ATTACHMENT FOR TRACTORS

Robert H. Galbreath, Denver, Colo., assignor to Howry-Berg, Inc., Denver, Colo., a corporation of Colorado Application February 8, 1944, Serial No. 521,739

11 Claims. (Cl. 214—140)

This invention relates to a combined loading and bulldozing attachment for tractors and has for its principal object the provision of a simple and efficient device which can be quickly and easily attached to any tractor to convert the latter into a combined bulldozer and loader.

Other objects of the invention are: to so construct the device that it will elevate its load forwardly and upwardly to position the latter over a receiving vehicle before the load is discharged; to provide means whereby the loading position of the shovel and the angle or pitch thereof may be regulated so that it may be used for either excavating or surface loading as desired; and to provide a construction in which the thrust reaction against the blade or shovel will be transmitted directly back to the tractor without strain or stress on the supporting structure.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side view of the improved combined bulldozing and loading attachment illustrating its relative position on a tractor;

Fig. 2 is a detail section taken on the line 2—2, Fig. 1;

Fig. 3 is a plan view of the attachment;

Fig. 4 is an enlarged detail view of the shovel adjusting shaft, taken on the line 4—4, Fig. 3; and Fig. 5 is a similar detail view of the bucket pivot, taken on the line 5—5, Fig. 3.

In the drawing the position of a typical tractor of the caterpillar type is indicated in broken line at 10.

The improved attachment is supported from a pair of frame bars 11 of any desired type or size depending upon the particular tractor to which the attachment is to be applied. In the usual caterpillar type tractor the bars 11 consist of relatively short channel irons bolted or otherwise secured to the opposite sides of the wheel frame of the tractor. On tractors of the wheeled type the bars 11 could be supported on the extremities of a suitable cross frame extending beneath the tractor. Two frame plates 22 are secured to, and arise above, the frame bars 11. A standard 12 is secured to, and arises from, each of the frame bars 11 and frame plates 22, to a position above the tractor 10. The two standards are connected by means of a cross shaft 13, which may be mounted in suitable bearing plates 14 secured to the standards 12.

A shovel arm 15 extends diagonally downwardly and forwardly from the shaft 13 at each side of the tractor, terminating in pivot bearings 16. The shovel arms 15 are tied together at the front by means of a cross brace 37. A shovel 17 is rotatably mounted between the forward extremities of the arms 15. The shovel is preferably scoop-shaped with a concave back plate similar to the usual bulldozer blade and a flat bottom terminating in inclined ends as illustrated. It is mounted by securing pads to its ends from which pivot studs 18 project. The studs 18 are journalled in the pivot bearings 16 of the bucket arms.

A thrust beam 19 is positioned at each side of the tractor. The beams 19 extend forwardly from hinge pins 20 which are mounted between the frame plates 22 at each side of the tractor. A pin 21 extends oppositely outward from each side of the forward extremity of each of the beams 19. The protruding extremities of the pins 21 may be provided with suitable cylindrical rollers 23 which travel on supporting bars 24. The supporting bars are maintained in parallel spaced relation below the shovel arms 15 by means of spacing blocks 25.

The forward extremities of the thrust beams 19 are positioned to contact adjustable stop blocks 26, the position of which may be varied through the medium of depth adjusting jack screws 27.

The shovel arms 15 are raised about the shaft 13 through the medium of hydraulic cylinders 28 which actuate pistons 29. The lower extremities of the cylinders 28 are hinged on cylinder pins 30 mounted between the plates 22. The upper extremities of the pistons 29 terminate in bearings 31 secured to the lower sides of the shovel arms 15. It can be readily seen that if hydraulic pressure is applied to the cylinders 28, the pistons 29 will be forced outwardly therefrom. The outward movement of the pistons will be communicated to the shovel arms 15 to lift the shovel 17 to the broken line positions A and B of Fig. 1. The shovel arms 15 are trussed by means of a truss rod 43 which assists in absorbing the bending movement imparted by the hydraulic pistons 29.

The hydraulic pressure is supplied from an engine driven pump on the tractor as is usual in hydraulically operated road machinery. The pressure source and the hydraulic connections are not illustrated on the drawing since they are common in the art to which this invention applies.

The shovel is so balanced that when loaded it will tend to tilt downwardly at the front and when empty will tend to balance horizontally. It is prevented from tilting downwardly until desired by means of a latch hook 32, the hooked free extremity of which extends over and engages the back plate of the shovel as illustrated. A hook releasing device such as a chain or a cable 41 extends from the hook 32 to a position within reach of the tractor operator.

The hook 32 is swingingly mounted on a crank 33 formed on a crank shaft 34. The crank shaft is journalled in bearing plates 35 extending upwardly from one of the shovel arms 15 and in a suitable bearing 36 supported on the cross brace 37. The crank shaft 34 can be rotated through the medium of a hand-operated, depth-adjusting lever 38 positioned within reach of the operator. The lever 38 is rotatably mounted on the shaft 13 and can be locked in any desired position in the usual lever latch and locking sector 39. A connecting rod lever 40 extends from the lever 38 and is connected, through the medium of a connecting rod 41, with an actuating lever 42 formed on the crank shaft 34. Before use, the operator adjusts the jack screws 27 to raise or lower the lowermost position of the shovel to accommodate the work to be done. He then adjusts the lever 38, which controls the forward projection of the hook 32, so as to raise or lower the forward edge of the shovel either for excavating as shown at D, or simple surface loading as shown at E, Fig. 1. Loading is accomplished by driving the tractor forward with the shovel in its lowermost position until the latter is filled. Hydraulic pressure is then applied to the pistons 28 to elevate the shovel, as indicated in broken line at A and B in Fig. 1, to the desired height. The tractor is then manipulated if necessary to position the shovel over a receiving bin or vehicle and the cable 41 is pulled to release the latch hook 32 from the rear plate of the shovel. This allows the shovel to tilt, as indicated at C in Fig. 1, to discharge the load therefrom. The natural balance of the shovel will, when the load has been discharged, swing it back beneath the latch hook 32 to be again engaged thereby. If for any reason, such as due to adhering material in the shovel, it fails to swing back to its former position it can be easily returned by simply lowering it again to the ground engaging position by releasing the hydraulic pressure and then backing the tractor.

It is desired to call attention to several advantages attained by the above recited construction:

First, when the shovel is being used for bulldozing or pushing the thrust of the tractor is transmitted from below the tractor wheel axis directly to the shovel from the frame plates 22 through the thrust beams 19, the thrust blocks 26 and the jack screws 27. No strain is placed on the shovel arms 15 or the supporting standards 12. This allows the supporting structure to be built of lighter material than would otherwise be necessary and removes any tendency to tilt the tractor rearwardly such as would be the case were the thrust applied above the wheel axis.

Second: The connecting rod 41 is operating between the fixed lever 40 and the movable lever 42 when the load is being lifted. This causes the latching hook 32 to move forward gradually as the load is elevated so as to maintain the shovel level as shown at A and prevent the load from being spilled over the back of the shovel at the topmost positions.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A loading attachment for tractors comprising: a pair of frame members; means for fixedly attaching said frame members to each side of a tractor; a vertical standard arising from each frame member; a shovel arm hinged at the top of each standard and extending forwardly and downwardly therefrom; means for raising the forward extremities of said shovel arms; a pair of thrust beams, each beam being mounted on one of said frame members at its rearward extremity and extending forwardly to one of said shovel arms; and means for transmitting the rearward and downward thrust of the shovel arms to said thrust beams so that the latter will act as a stop for the former.

2. A loading attachment for tractors comprising: a pair of frame members; means for fix:dly attaching said frame members to each side of a tractor; a vertical standard arising from each frame member; a shovel arm hinged at the top of each standard and extending forwardly and downwardly therefrom; means for raising the forward extremities of said shovel arms; a pair of thrust beams, each beam being pivotally mounted on one of said frame members at its rearward extremity and extending forwardly to one of said shovel arms; means for transmitting the rearward and downward thrust of the shovel arms to said thrust beams so that the latter will act as a stop for the former; a guiding-slide device on each of said shovel arms; means on the forward extremity of each thrust beam mounted in said guiding-slide device so that as said shovel beams swing upwardly, said forward extremities will move upwardly and rearwardly therealong; and stop means for limiting the downward movement of said extremities in said devices.

3. A loading attachment for tractors comprising: a frame member arranged for attachment at each side of said tractor; a standard arising from each frame member; a shovel arm hinged adjacent the upper extremity of each standard and extending downwardly and forwardly therefrom; a shovel mounted between the forward extremities of said shovel arms; means for elevating the free extremities of said shovel arms; a thrust beam extending forwardly from each of said frame members to a position to receive the rearward thrust of said shovel arms; and stop means for contacting said thrust beams to limit the downward arc of the free extremities of said shovel arms and to transmit the rearward thrust of said shovel to said frame member when the former is in its lowermost position.

4. A loading attachment for tractors comprising: a frame member arranged for attachment at each side of said tractor; a standard arising from each frame member; a shovel arm hinged adjacent the upper extremity of each standard and extending downwardly and forwardly therefrom; a shovel mounted between the forward extremities of said shovel arms; means for elevating the free extremities of said shovel arms; a thrust beam hinged to and extending forwardly from each of said frame members to a position to receive the rearward thrust of said shovel arms when said shovel is lowered; stop means for contacting said thrust beams to limit the downward arc of the free extremities of said shovel arms; and means for varying the position of said stop means to adjust the lowermost position of said shovel arms.

5. A loading attachment for tractors comprising: a frame member arranged for attachment at each side of said tractor; a standard arising from each frame member; a shovel arm hinged adjacent the upper extremity of each standard and extending downwardly and forwardly therefrom; a shovel mounted between the forward extremities of said shovel arms; means for elevating the free extremities of said shovel arms; a thrust beam hingedly supported at each side of said tractor and extending forwardly therefrom; a guide member on each of said shovel arms supporting the forward extremity of each of said thrust beams; and means for transmitting the rearward thrust of said shovel to said thrust beams.

6. In a loader of the type having a shovel swingingly mounted between a pair of hinged shovel arms, means for resisting tilting of said shovel as said arms swing upwardly comprising: a connecting rod; a hinged connection for one extremity of said rod; means for fixedly supporting said connection independently from said shovel arms and eccentrically of the hinge axis of said shovel arms; and a connection between the other extremity of said connecting rod and said shovel for imparting the differential movement created by the eccentric hinged connection to said shovel as said arms swing upwardly.

7. In a loader of the type having a shovel swingingly mounted between a pair of hinged shovel arms, means for resisting tilting of said shovel as said arms swing upwardly comprising: an adjusting lever pivoted concentrically of the hinge axis of said shovel arms; means for maintaining said adjusting lever in any desired radial position; a connecting rod extending from said adjusting lever eccentric of the axis thereof; and a connection between the other extremity of said connecting rod and said shovel.

8. In a loader of the tractor type having a pair of shovel arms extending normally downward and forward from an elevated hinge axis with a shovel mounted between the free forward extremities of said shovel arms, means for resisting the rearward thrust of said shovel comprising: thrust members mounted below said hinge axis and positioned to prevent rearward movement of said shovel when the latter is in its lowermost position to absorb the thrust thereof.

9. In a loader of the tractor type having a pair of shovel arms extending normally downward and forward from an elevated hinge axis with a shovel mounted between the free forward extremities of said shovel arms, means for resisting the rearward thrust of said shovel comprising: a pair of thrust beams; fixed hinge members supporting the rear extremities of said thrust beams on an axis below the hinge axis of said shovel beams; a thrust member carried by the forward extremity of each of said shovel beams; and means for transmitting the thrust of said thrust members to said thrust beams when said shovel is in its lowermost position.

10. In a loader of the tractor type having a pair of shovel arms extending normally downward and forward from an elevated hinge axis with a shovel mounted between the free forward extremities of said shovel arms, means for resisting the rearward thrust of said shovel comprising: a pair of thrust beams; fixed hinge members for the rearward extremities supporting the rear extremities of said thrust beams on an axis below the hinge axis of said shovel beams; a thrust member carried by the forward extremity of each of said shovel beams; means for transmitting the thrust of said thrust members to said thrust beams when said shovel is in its lowermost position; and means for supporting the forward extremities of said thrust beams from said shovel arms.

11. A loading attachment for tractors comprising: a pair of frame members; means for fixedly attaching said frame members to each side of a tractor; a standard arising from each frame member; a shovel arm hinged at the top of each standard and extending forwardly and downwardly therefrom; means for raising the forward extremities of said shovel arms; a shovel mounted between the forward extremities of said shovel arms; a pair of thrust beams, each beam being pivotally mounted on one of said frame members at its rearward extremity; means for suspending the forward extremities of said thrust beams from said shovel arms so that the former may travel longitudinally of the latter as said shovel arms are raised; and means for limiting the length of travel of said thrust beams along said shovel arms so as to limit the arc of movement of said shovel beams about their hinge axes.

ROBERT H. GALBREATH.